United States Patent [19]

Bseilis

[11] Patent Number: 5,197,214
[45] Date of Patent: Mar. 30, 1993

[54] PENDULOUS SECURITY DEVICE

[76] Inventor: Robert Bseilis, 6894 Louis Dupire, Montreal H1M-3A6, Canada

[21] Appl. No.: 688,159

[22] Filed: Apr. 19, 1991

[51] Int. Cl.$^5$ ............................................. G09F 7/22
[52] U.S. Cl. ...................................... 40/617; 40/590; 280/288.4; 116/28 R
[58] Field of Search ................. 40/590, 591, 617, 602; 280/288.4; 116/28 R; 359/838, 842, 844; 248/683

[56] References Cited

U.S. PATENT DOCUMENTS

| | | | |
|---|---|---|---|
| 3,768,433 | 10/1973 | Dian et al. | 40/590 X |
| 3,982,771 | 9/1976 | Tropeano | 40/590 X |
| 4,113,216 | 9/1978 | Fuse et al. | 40/617 X |
| 4,248,001 | 2/1981 | Feuvray | 40/602 |
| 4,321,883 | 3/1982 | Ruppa | 280/288.4 X |
| 5,048,451 | 9/1991 | Reimers et al. | 40/602 X |

Primary Examiner—James R. Brittain
Assistant Examiner—J. Bonifanti

[57] ABSTRACT

The major feature of the invention is its continuous pendulous movement whether the vehicle is in motion or not, because it is so light in weight that even a breeze would cause it to move, thus causing it to reflect the light whether at night or during the day from different angles.

A further feature of the invention resides in a safety signal device which is novel in construction, inexpensive in manufacturing, resistant, colorful, decorative and easy to install upon a vehicle and which is efficient in operation.

1 Claim, 4 Drawing Sheets

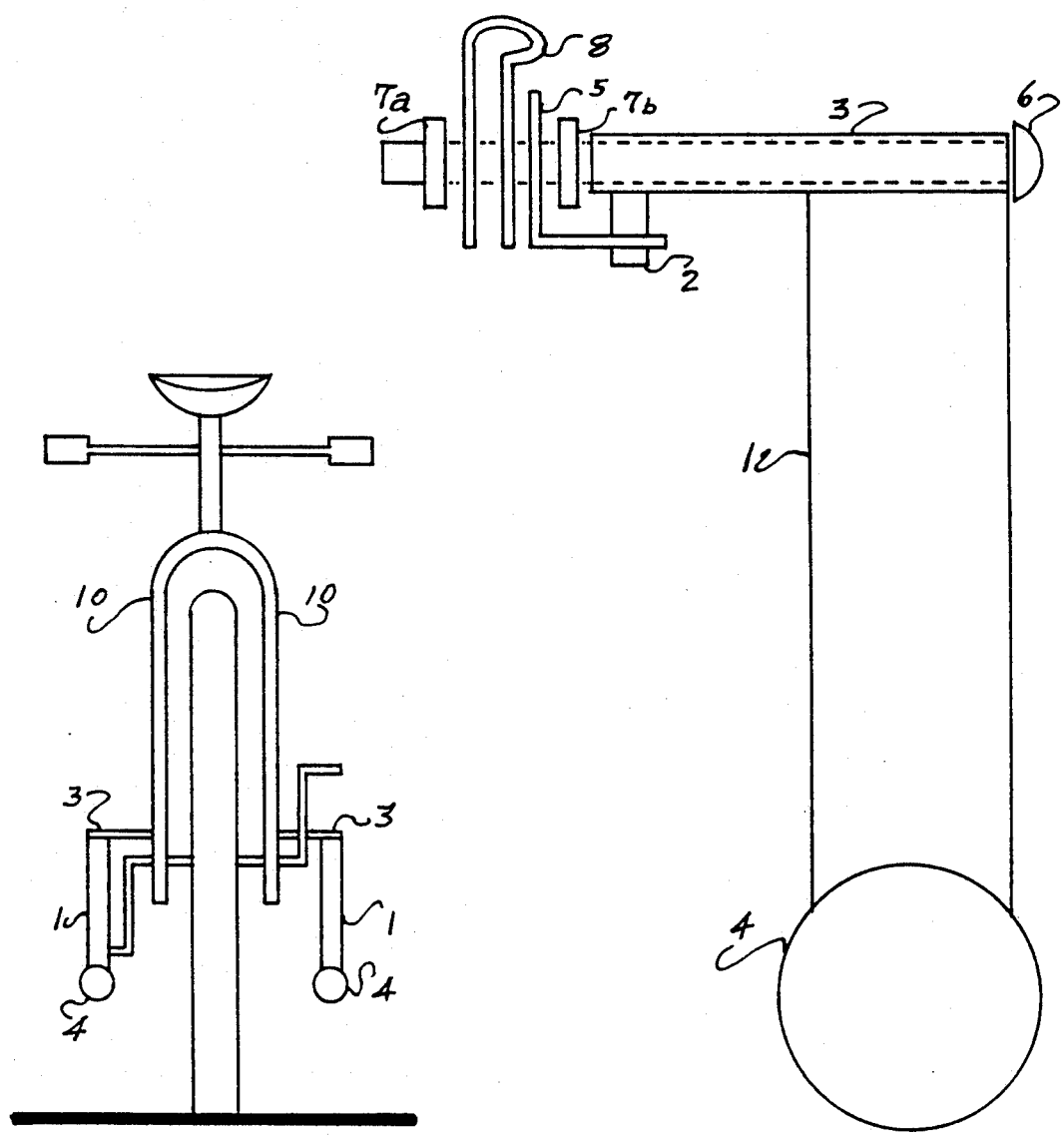
FIG. 3
FIG. 5
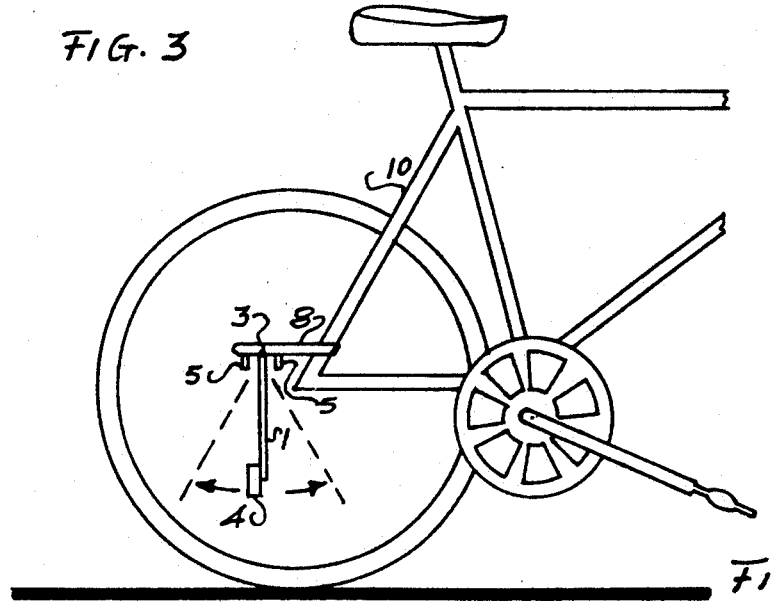
FIG. 4

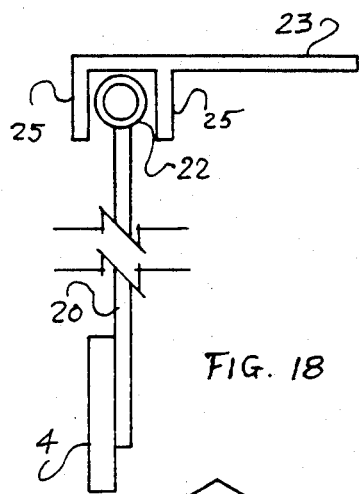
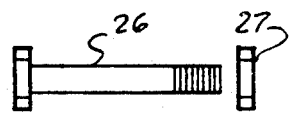
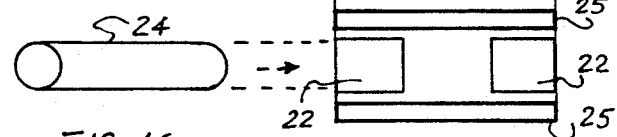
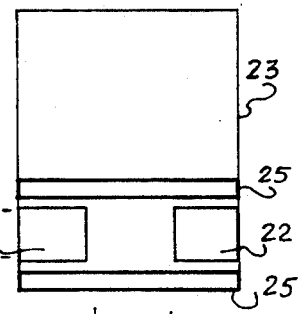
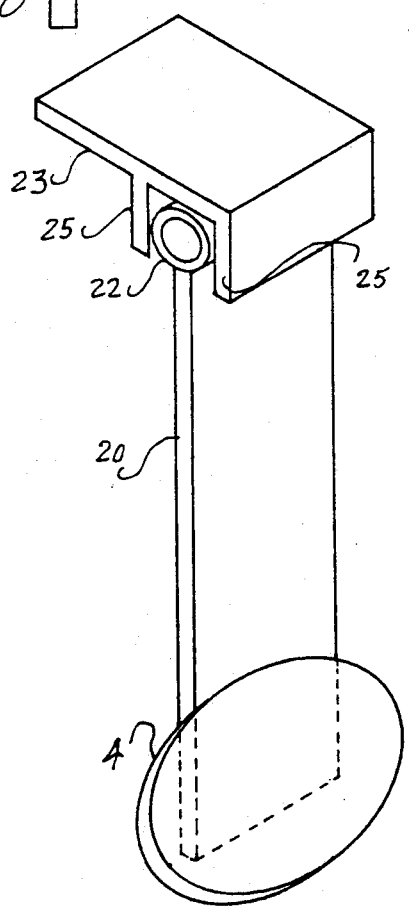
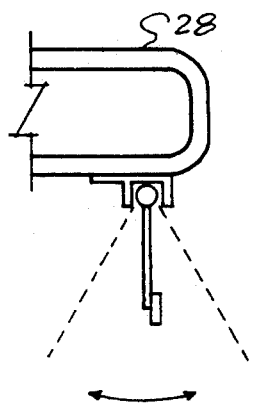
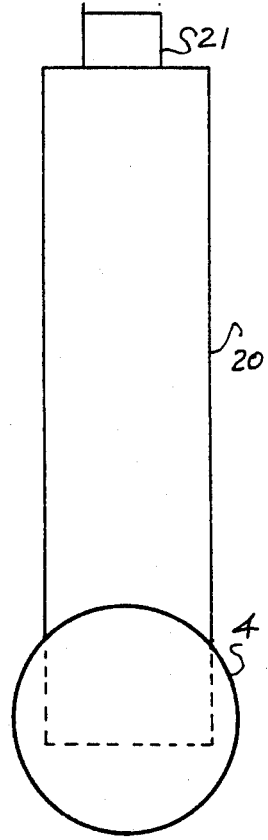

5,197,214

PENDULOUS SECURITY DEVICE

SUMMARY OF THE INVENTION

The pendulous security device (PSD), is an invention that relates to an improvement in vehicles (bicycles and cars) safety signal.

One of the several features of the invention resides in a reflector signal device, which when installed upon a vehicle, receives the light rays from the headlights of approaching vehicles, regardless of the angle of approach because of its continuous pendulous movement, to reflect a colored light to warn the driver of the approaching vehicle of the presence of another vehicle which may be in his path.

DESCRIPTION OF THE VIEWS OF THE DRAWINGS

Other features of the invention will appear as the following specifications are read in conjunction with the accompanying drawings:

FIG. 3 is a close-up view of a pair of PSDs mounted on a bicycle frame.

FIG. 4 is a side view of a PSD mounted on a bicycle frame in which the dotted lines and the double-headed curved arrow indicate the pendulous movement of the device.

FIG. 5 is an enlarged general view of the PSD with its attachment devices designed for bicycles.

FIG. 14 is a front view of the PSD designed for cars.

FIG. 15 is a top plan view of the fixation support for the PSD designed for cars.

FIG. 16 is a view of the fixation pin.

FIG. 17 shows a bolt and nut, a choice to replace the pin, a possibility during the manufacturing process (FIG. 16).

FIG. 18 shows a side view of the PSD designed for cars.

FIG. 19 is a mounted side view showing the pendulous movement of the device designed for cars installed underneath the bumper.

FIG. 20 is a general view showing the PSD designed for cars with its fixation support.

DETAILED DESCRIPTION

Figure 1:
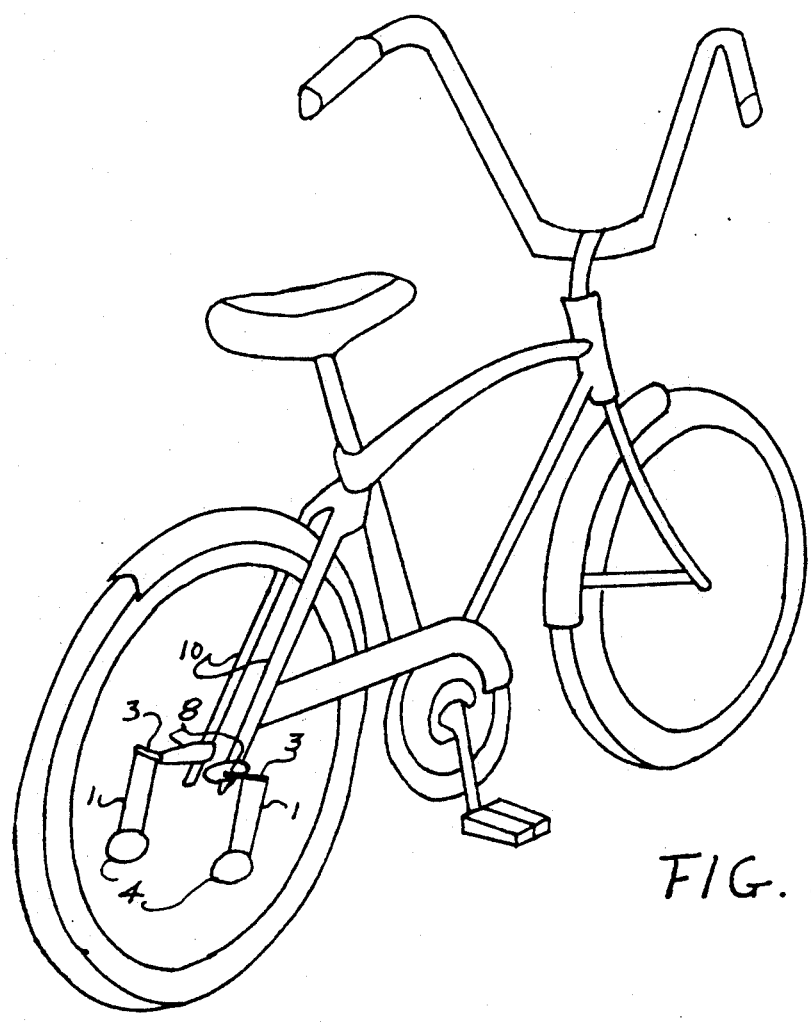
FIG. 1 is a graphic view of a pair of PSDs mounted on the rear of a bicycle frame.

Referring to the drawings by reference characters, we shall give a detailed description and function of the PSD.

In FIG. 5 a general view of the PSD designed for bicycles and its fixation accessories, we find:

The plate (1) (plastic or metal) which could have different sizes and colors corresponding to the vehicle on which it will be installed.

This plate holds on its lower extremity the reflector (4), and on the other extremity there is a cylinder (3) on which a stopper tooth (2) is attached.

The parts (1), (2) and (3) are the major components of the invention. They can be manufactured separately and glued together; or they could be produced by one mould, uniting all of them in one piece.

Figure 13:
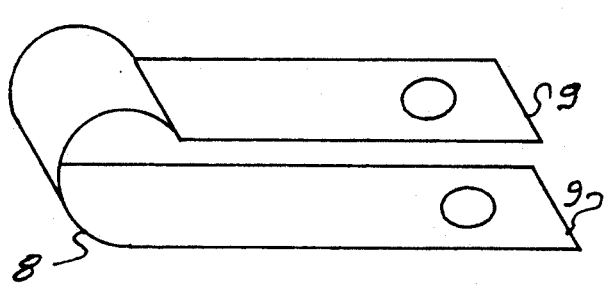
FIG. 13 is a general view of the fixation bracket of the PSD designed for bicycles.

The device is attached to the bicycle frame (10) by holes in legs (9) of the fixation bracket (8) which is FIG. 13.

The bolt (6) traverses the cylinder (3) and the fixation bracket (8).

Figure 9:
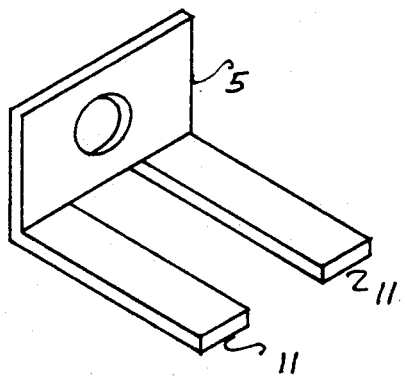
FIG. 9 is an enlarged view of the stopper that controls the pendulous movement for PSD designed for bicycles.
Figure 10:
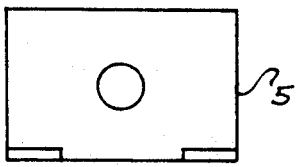
FIG. 10 is a front view of the stopper that controls the pendulous movement for PSD designed for bicycles.
Figure 11:
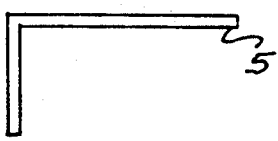
FIG. 11 is a side view of the stopper that controls the pendulous movement for PSD designed for bicycles.
Figure 12:
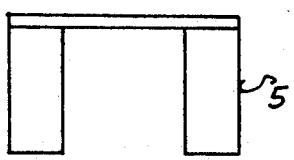
FIG. 12 is a top view of the stopper that controls the pendulous movement for PSD designed for bicycles.
Figures 6, 7:
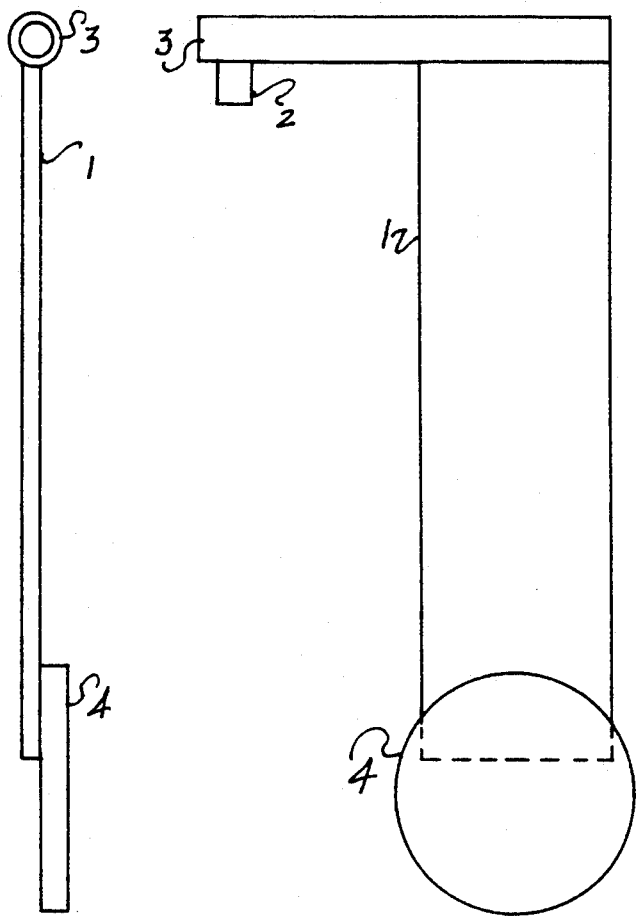
FIG. 6 is a basic front view of the PSD designed for bicycles.
FIG. 7 is a basic side view of the PSD designed for bicycles.

First and second nuts (7a, 7b), one of which (7b) is placed before the stopper (5), which is FIG. 9, the other (7a) after the fixation bracket (8).

The bolt (6) has a diameter inferior to the diameter of the cylinder (3) causing therefore the free movement of the device. This pendulous movement is controlled by horizontal elements (11) on the stopper (5) and the tooth (2). These two components forbid also the plate (1) from making a complete overturn as it clearly shows in FIG. 4.

By reason of the function of the PSD, the plate (1) could also be produced from a reflecting material, identical to that of the reflector (4) which is held on its lower extremity.

Figure 2:
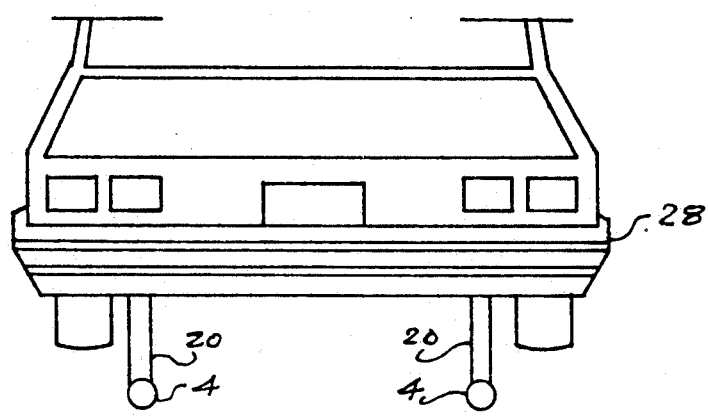
FIG. 2 is a general view of a pair of PSDs mounted on the rear bumper of a car.
Figure 8:
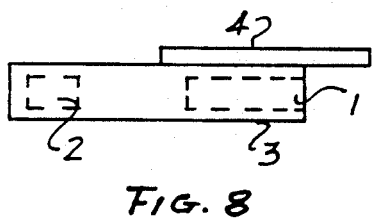
FIG. 8 is a top view of the PSD designed for bicycles.

As mentioned before, the PSD could also be used to enhance safety signal for cars (FIG. 2).

It carries the same principle as for bicycles and varies only in size and in the fixation accessories (FIG. 20).

FIG. 14 illustrates the plate (20) which holds on its lower end the reflector (4) and on the upper extremity is the central portion of the cylinder (21).

FIG. 15 shows the fixation for the PSD designed for cars. It comprises a plastic plate (23) with two side portions (22) of the cylinder that will line up with the central portion (21). It also comprises two stoppers (25), one from each side of the divided cylinder (21 and 22). Finally, a pin (24) traverses all portions of the cylinder (21 and 22) that can be seen by the other side in FIG. 18.

When the fixation is made from metal, a bolt (26) and a nut (27) are used, FIG. 17, instead of the pin (24) FIG. 16.

FIG. 20 shows a general view of the PSD designed for cars with its fixation. The top surface of the fixation (23) is the contact surface where the device is installed to the rear bumper (28) of the car with a stripe of a high-bond, double-faced tape (made by the 3M Co.) or by means of two bolts, all as clearly illustrated in FIG. 19.

Having thus described the invention, what I claim as new and what I want the patent office of the U.S. to secure is:

1. A pendulous security device, designed for a vehicle, comprising:

a bolt, having a head at a forward end thereof and a first nut at a rearward end thereof;

a hollow cylinder, surrounding and freely rotatable about said bolt rearward of said head, said cylinder having forward and rearward ends and including a plate having upper and lower ends, the upper end of said plate being affixed to the forward end of the cylinder and the lower end of the plate being affixed to a reflector;

a rectangular tooth, attached to and hanging from said rearward end of said cylinder so as to hang parallel to said plate, said plate, tooth and cylinder being of a single piece construction;

a second nut, affixed to said bolt rearward of said cylinder to control the axial movement thereof;

a stopper, comprising a rectangular plate having a central hole receiving said bolt, and two horizontal elements parallel to each other and protruding perpendicularly from said plate, said stopper receiving the bolt rearward of the second nut such that the tooth swings between and is restrained by the horizontal elements;

and a bracket comprising a U-shaped upper portion, for attaching the device to a vehicle, and two legs, one extending from each side of the U-shaped upper portion so as to be parallel to each other, each leg including a hole which receives the bolt rearward of said stopper and forward of said first nut.

* * * * *